United States Patent
Hoech et al.

(10) Patent No.: US 8,661,246 B1
(45) Date of Patent: Feb. 25, 2014

(54) SYSTEM AND METHOD FOR PROTECTING CERTIFICATE APPLICATIONS USING A HARDENED PROXY

(75) Inventors: Karl F. Hoech, Cedar Rapids, IA (US); James N. Potts, Cedar Rapids, IA (US); Gregory W. Rice, Cedar Rapids, IA (US); Mark A. Bortz, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 3 days.

(21) Appl. No.: 13/442,061

(22) Filed: Apr. 9, 2012

(51) Int. Cl.
- *H04L 29/06* (2006.01)
- *H04L 9/32* (2006.01)
- *G06F 11/00* (2006.01)
- *G06F 15/16* (2006.01)

(52) U.S. Cl.
USPC ............... 713/156; 713/168; 726/23; 726/25; 709/206

(58) Field of Classification Search
USPC .......... 713/168–174, 182–186, 202; 709/225, 709/229; 726/2–8
See application file for complete search history.

(56) References Cited

U.S. PATENT DOCUMENTS

| | | | |
|---|---|---|---|
| 6,772,347 B1 | 8/2004 | Xie | |
| 7,512,970 B2 * | 3/2009 | Naftali et al. | 726/4 |
| 7,640,433 B1 | 12/2009 | Marek | |
| 2004/0103322 A1 | 5/2004 | Wesinger | |
| 2004/0111519 A1 | 6/2004 | Fu | |
| 2005/0262558 A1 | 11/2005 | Usov | |
| 2007/0022479 A1 | 1/2007 | Sikdar | |
| 2007/0266063 A1 | 11/2007 | Camiel | |
| 2009/0094342 A1 | 4/2009 | Leiba | |
| 2009/0158430 A1 | 6/2009 | Borders | |
| 2010/0077445 A1 | 3/2010 | Schneider | |
| 2010/0122313 A1 | 5/2010 | Ivgi | |
| 2010/0312843 A1 | 12/2010 | Robinson | |

OTHER PUBLICATIONS

A Comparative Analysis of Anti-Malware Software, Patch Management, and Host-Based Firewalls in Preventing Malware Infections on Client Computers Garuba, M. ; Chunmei Liu ; Washington, N. ;Information Technology: New Generations, 2008. ITNG 2008. Fifth International Conference on;, year 2008.*
Rusty Jackson: Using an authorization server Jan. 27, 2011.*
Firewall article in Wikipedia printed out in year 2013.*
Proxy Server article in Wikipedia.*

(Continued)

*Primary Examiner* — Evans Desrosiers
(74) *Attorney, Agent, or Firm* — Donna P. Suchy; Daniel M. Barbieri

(57) ABSTRACT

A system for preventing computer software from communicating from a user computer in a network to untrusted remote computers. A host-based credential management agent is operably connected to a user computer for intercepting network traffic information from the user computer and transmitting a network request including credentials of the remote computer and the network traffic information. A trusted credential database contains information identifying trusted entities and corresponding cryptographic certificates. A server cooperates with the management agent for i) verifying whether the user computer in the network request should have network access, and ii) cryptographically signing the intercepted network traffic information with an authorization server key, to authorize network access for the intercepted information. A firewall is operably connected to the user computer and the authorization server. It is configured to inspect the traffic information from the user computer and reject any traffic information not signed with the key.

15 Claims, 3 Drawing Sheets

(56) References Cited

OTHER PUBLICATIONS

A Comparative Analysis of Anti-Malware Software, Patch Management, and Host-Based Firewalls in Preventing Malware Infections on Client Computers: Moses Garuba, Chunmei Liu, and Nicki Washington; Department of Systems and Computer Science, Howard University year 2008.*

MIT Kerberos Consortium; Why is Kerberos a Credible Security Solution?; 2008 by MIT Kerberos Consortium; Downloaded From www.kerberos.org/software/whykerberos.pdf on Sep. 16, 2011.

* cited by examiner

SYSTEM AND METHOD FOR PROTECTING CERTIFICATE APPLICATIONS USING A HARDENED PROXY

BACKGROUND OF THE INVENTION

1. Field of the Invention

The present invention relates generally to communication networks and more particularly to an enhanced system for protecting communication networks from communication with malicious remote entities.

2. Description of the Related Art

Networked applications commonly use certificates to verify the integrity of remote entities and the integrity and confidentiality of communications to/from the remote location. However, vulnerability exists in that the local trust databases (containing roots of trust chain) may be subverted or modified by unwitting or malicious users or software. This may result in the insertion of trust roots which are not trustworthy with respect to enterprise policy. This results in the local user or software placing trust in non-trustworthy communications, documents or remote locations.

U.S. Publicn. No. 2005/0262558, entitled "ON-LINE CENTRALIZED AND LOCAL AUTHORIZATION OF EXECUTABLE FILES," discloses a system and method for controlling the execution of executable files. The executables are identified by either a cryptographic digest or a digital certificate. The cryptographic digest is computed from the binary image of the executable. An executable that is attempting to execute is intercepted by a protection module that consults a database of stored rules over a secure channel to determine whether or not the executable can be identified as a permitted executable and whether or not it has permission to execute on a particular computer system under certain specified conditions. If a stored permission is available, it is used to control the execution. Otherwise, the user is consulted for permission.

U.S. Publicn. No. 2010/0077445, entitled "GRADUATED ENFORCEMENT OF RESTRICTIONS ACCORDING TO AN APPLICATION'S REPUTATION," discloses security software on a client that observes a request for a resource from an application on the client and then determines the application's reputation. The application's reputation may be measured by a reputation score obtained from a remote reputation server. The security software determines an access policy from a graduated set of possible access policies for the application based on the application's reputation. The security software applies the access policy to the application's request for the resource. In this way, the reputation-based system uses a graduated trust scale and a policy enforcement mechanism that restricts or grants application functionality for resource interactivity along a graduated scale.

SUMMARY OF THE INVENTION

In a broad aspect, the present invention is a system for preventing computer software from communicating from a user computer in a network to untrusted remote computers. A host-based credential management agent is operably connected to a user computer and configured to intercept network traffic information from the user computer and transmit a network request including credentials of the remote computer and the network traffic information. A trusted credential database contains information identifying trusted entities and corresponding cryptographic certificates. An authorization server is operably connected to the host-based credential management agent and connected to the trusted credential database. The authorization server is configured to cooperate with the host-based credential management agent for i) verifying whether the user computer in the network request should have network access, and ii) cryptographically signing the intercepted network traffic information with an authorization server key, to authorize network access for the intercepted network traffic information. A firewall system is operably connected to the user computer and the authorization server. It is configured to inspect the network traffic information from the user computer and reject any traffic information not signed with the authorization server key.

The present invention prevents software from connecting to the outside world by adding connection-level authentication and authorization to network traffic.

DETAILED DESCRIPTION OF THE INVENTION

Figure 1:
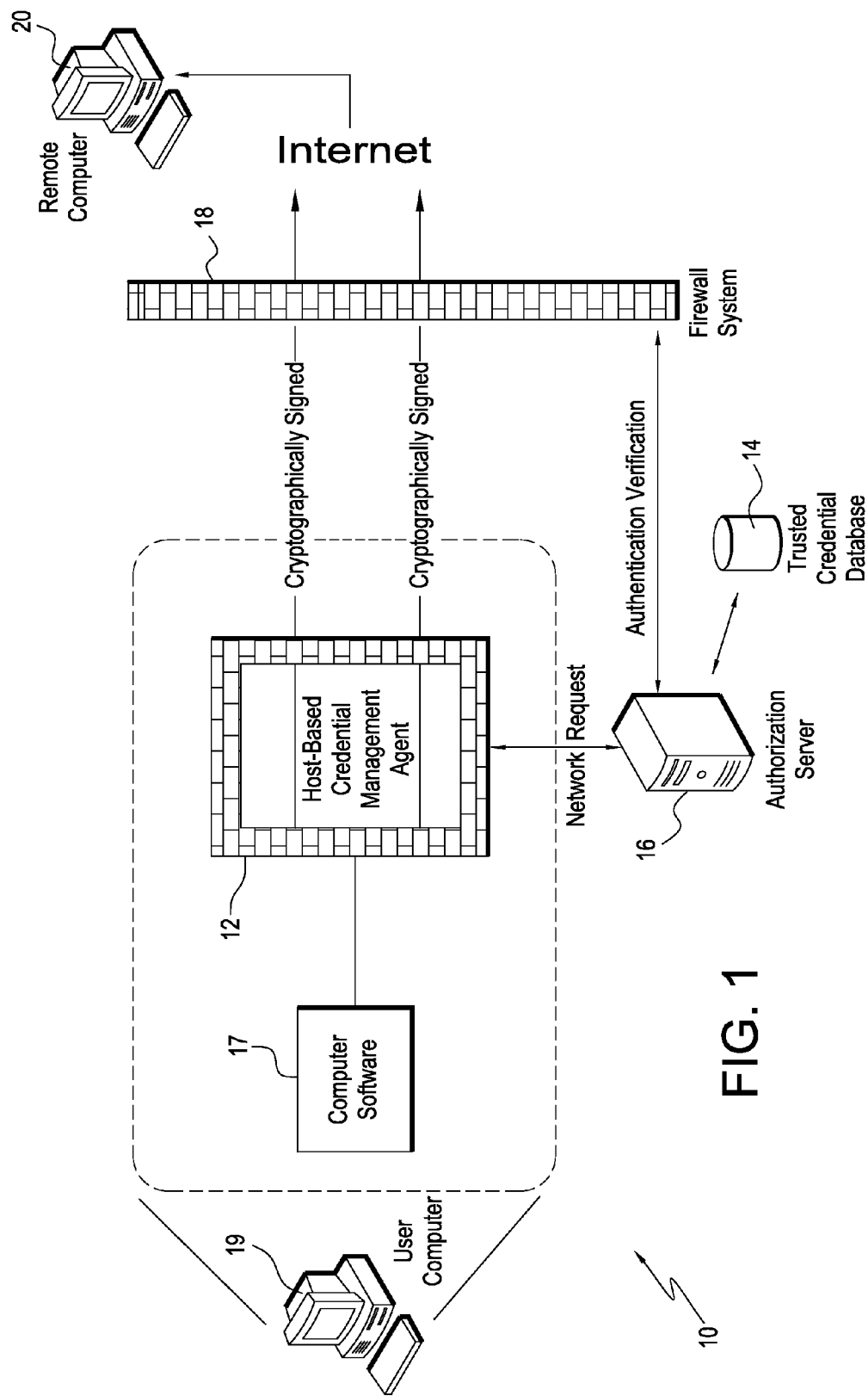
FIG. 1 is a schematic illustration of the system of the present invention for preventing computer software on a user computer in a network from communicating with untrusted remote computers.

Referring now to the drawings and the characters of reference marked thereon, FIG. 1 illustrates the system for preventing computer software 17 located on a user computer 19 in a network from communicating with remote computers 20 presenting untrusted credentials, designated generally as 10. The system 10 includes a host-based credential management agent 12; a trusted credential database 14; an authorization server 16 and a firewall system 18. The host-based credential management agent 12 is operably connected to a user computer 19 and is configured to intercept network traffic information from the user computer 19 and transmit a network request comprising credentials of the remote computer 20 and the network traffic information. The trusted credential database 14 contains information identifying trusted entities and corresponding credentials. The authorization server 16 is operably connected to the host-based credential management agent 12 and connected to the trusted credential database 14. The authorization server 16 is configured to cooperate with the host-based credential management agent 12 for i) verifying whether the user computer 19 in the network request should have network access to the remote computer 20, and ii) cryptographically signing the intercepted network traffic information with an authorization server key, to authorize network access for the intercepted network traffic information. The firewall system 18 is operably connected to the user computer 19 and the authorization server 16 and is configured to inspect the network traffic information from the user computer 19 and reject any traffic information not signed with the authorization server key. A credential is typically a cryptographically-signed certificate such as a X.509 certificate or a Kerberos ticket. The present system 10 generally prevents computer software 17 from communicating information from the host computer 19 to an untrusted remote computer 20.

The host-based credential management agent 12 is a software component running on the user host computer. The authorization server 16 can be a software component running on a common computer server, or a standalone network appliance (a specialized computer system). The firewall system can be a software component providing functionality to a commercially available firewall proxy system, a standalone software component running on a computer server, or a standalone specialized computer system. The host-based credential management agent 12 may be incorporated into the user computer 19 or may be a specialized piece of computer hardware. Thus, the phrase that the host-based credential management agent 12 is "operably connected" to the computer 19 is deemed to be broadly construed to encompass both potential scenarios. Furthermore, as defined herein the term "internet" is meant to broadly refer to any internet working between disparate computer networks, including the commercial Internet, NIPRNet and SIPRNet.

The authorization server 16 may provide the cryptographic signing by signing individual network packets. This may be provided by, for example, applying internet protocol (IP) encapsulation by adding a cryptographic hash field to the intercepted network traffic information. Alternatively, it may be accomplished by applying an Internet Protocol header field such as an IPv4 header option field or IPv6 header chain field to the intercepted network traffic information. Or, such a signing may be accomplished by applying a transport layer wrapping protocol to the intercepted network traffic information.

The authorization server 14 may provide the cryptographic signing by adding a token. This may be by adding a tag-value pair to an application layer protocol.

Figure 2:
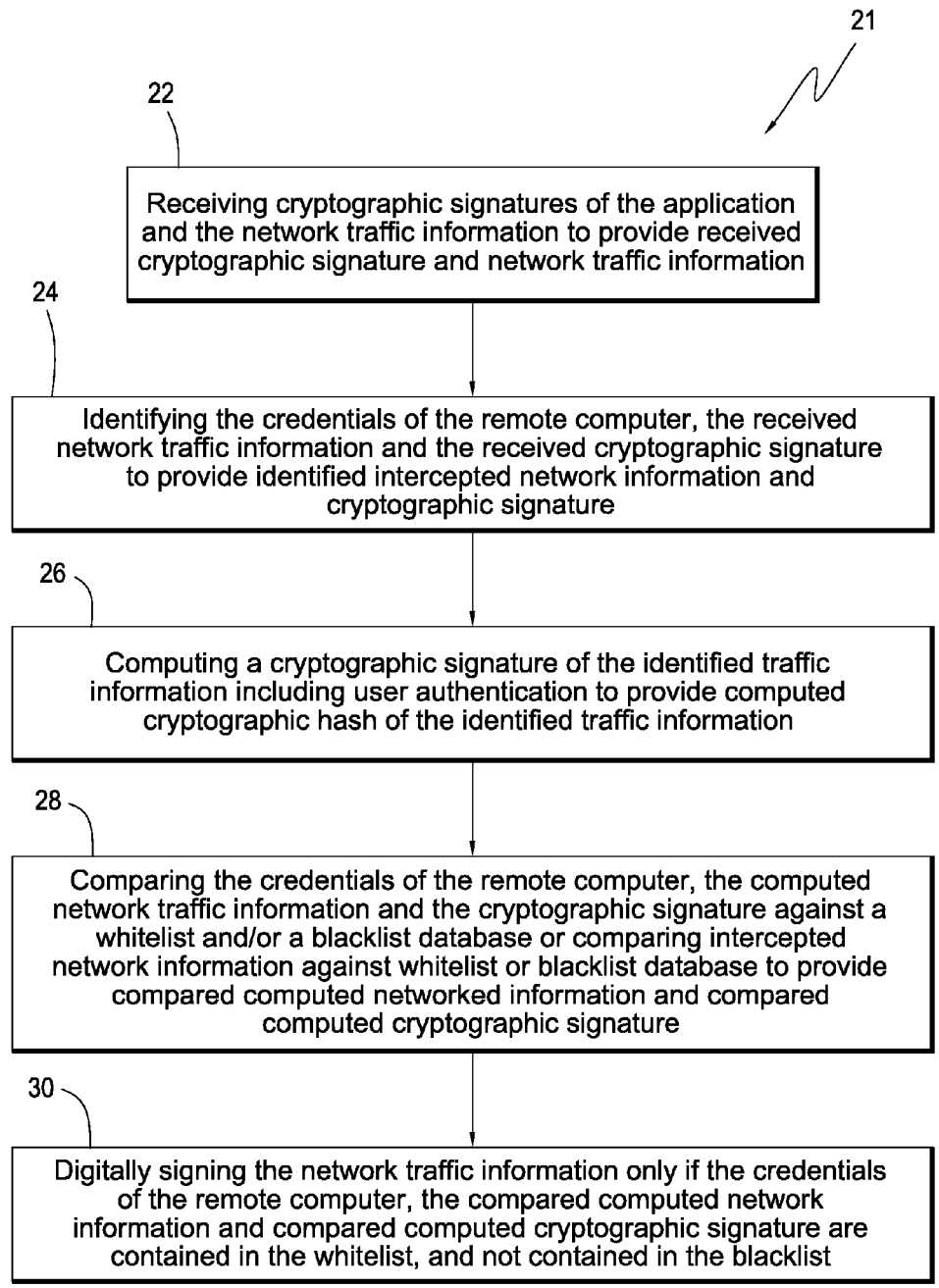
FIG. 2 is a flow chart showing one example of a decision making technique utilized by the authorization server of the present invention.

Alternatively, the authorization server 14 may provide the cryptographic signing by a decision making technique. Referring now to FIG. 2, an example decision making technique, designated generally as 21, may be as follows:

a) receiving cryptographic signatures of the application and the network traffic information to provide received cryptographic signature and network traffic information (process block 22);

b) identifying the credentials of the remote computer, the received network traffic information and the received cryptographic signature to provide identified intercepted network information and cryptographic signature (process block 24);

c) computing a cryptographic signature of the identified traffic information including user authentication to provide computed cryptographic hash of the identified traffic information (process block 26);

d) comparing the credentials of the remote computer, computed network traffic information and the cryptographic signature against a whitelist and/or a blacklist database or comparing intercepted network information against a whitelist or backlist database to provide compared computed networked information and compared computed cryptographic signature (process block 28); and, e) digitally signing the network traffic information only if the credentials of said remote computer, compared computed network information and compared computed cryptographic signature are contained in the whitelist, and not contained in the blacklist (process block 30).

Figure 3:
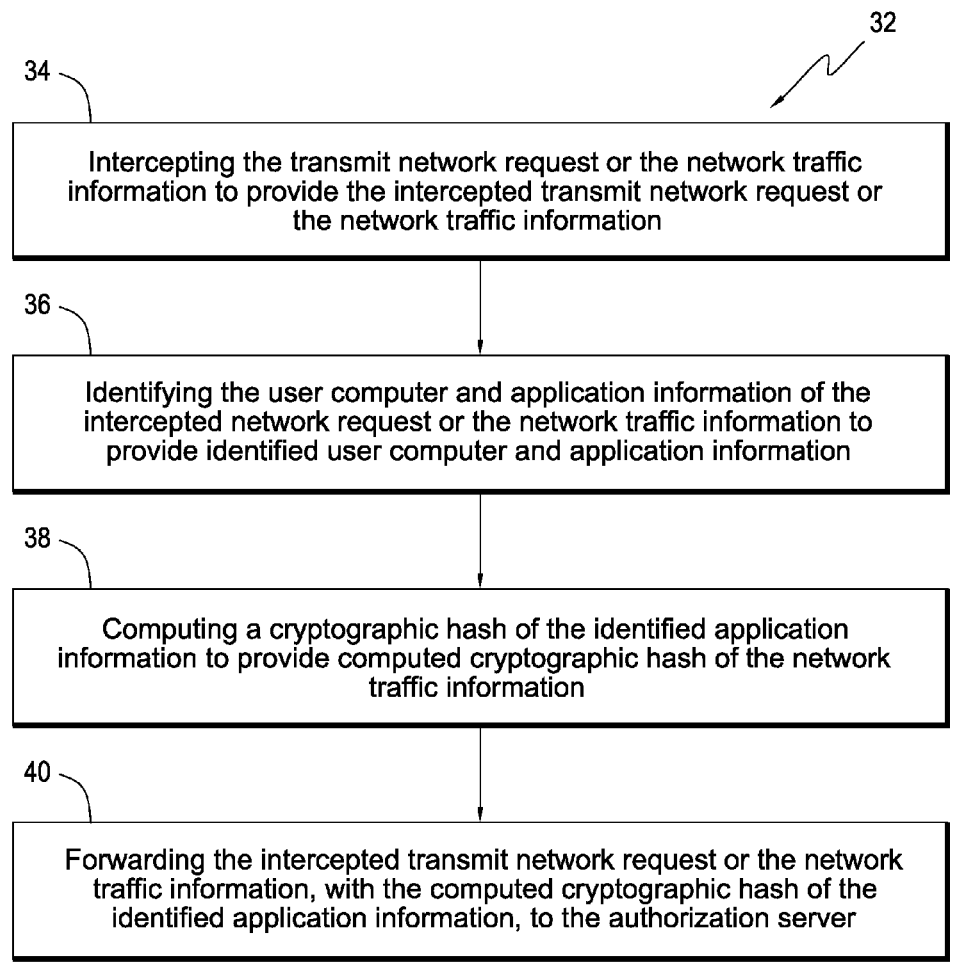
FIG. 3 is a flow chart showing an example of the host-based credential management agent.

Referring now to FIG. 3, the host-based credential management agent 12 may provide monitoring of the network traffic information by the following process, designated generally as 32:

a) intercepting the transmit network request or the network traffic information to provide the intercepted transmit network request or the network traffic information (process block 34);

b) identifying the credentials of the remote computer, of the intercepted network request or the network traffic information to provide identified credentials of said remote computer (process block 36);

c) computing a cryptographic hash of the identified information to provide computed cryptographic hash of the network traffic information (process block 38); and, d) forwarding the intercepted transmit network request or the network traffic information, with the computed cryptographic hash of the identified information, to the authorization server (process block 40).

In general terms, the firewall system 16 of the present invention operates by the following process:

The firewall system 18 of the present invention is designed to properly cooperate with the type of authorization server used. For example, if individual network packets are signed, by i) applying internet protocol (IP) encapsulation by adding a cryptographic hash field to the intercepted network traffic information or, ii) by applying an IPv4 header option field or IPv6 header chain field to the intercepted network traffic information, then the firewall system 18 may provide inspection of the network traffic information by the process of:

a) receiving the cryptographically signed network traffic information;

b) testing the validity of the cryptographic signature to provide validated cryptographic signature;

c) stripping the signature to restore the request to provide the original state prior to interception by the host-based credential management agent; and, d) forwarding the original intercepted network traffic information to an internet destination only if the signature is valid.

If the authorization server provides the cryptographic signing by signing individual network packets, by applying a transport layer wrapping protocol to the intercepted network traffic information then the firewall system 16 may operate as follows:

a) receiving the cryptographically signed token within the application layer protocol;

b) testing validity of the cryptographic signature to provide validated cryptographic signature;

c) stripping the token to restore the application layer request to provide the original state prior to interception by the host-based credential management agent; and, d) forwarding the original intercepted network traffic information to internet destination only if the signature is valid.

Other embodiments and configurations may be devised without departing from the spirit of the invention and the scope of the appended claims.

The invention claimed is:

1. A system for preventing secured access from a user computer in a network to remote computers presenting untrusted credentials, comprising:

a) a host-based credential management agent operably connected to a user computer configured to intercept network traffic information from said user computer and transmit a network request comprising credentials of said remote computer and said network traffic information;

b) a trusted credential database containing information identifying trusted entities and corresponding cryptographic certificates;

c) an authorization server operably connected to said host-based credential management agent and connected to said trusted credential database, said authorization server configured to cooperate with said host-based credential management agent for i) verifying whether the user computer in said network request should have network access to said remote computer, and ii) cryptographically signing said intercepted network traffic information with an authorization server key, to authorize network access for said intercepted network traffic information; and, d) a firewall system operably connected to said user computer and said authorization server, configured to inspect said network traffic information from said user computer and reject any traffic information not signed with said authorization server key wherein said authorization server provides said cryptographic signing by adding a token, by adding a tag-value pair to an application layer protocol.

2. The system of claim 1, wherein said authorization server provides said cryptographic signing by signing individual network packets.

3. The system of claim 2, wherein said firewall system provides inspection of said network traffic information by the process of:
   a) receiving said cryptographically signed individual network packets;
   b) testing validity of said cryptographic signature to provide validated cryptographic signature;
   c) stripping said signature to restore said signed individual network packets to provide the original state prior to interception by the host process monitor; and,
   d) forwarding said original intercepted network traffic information to an internet destination only if said signature is valid.

4. The system of claim 1, wherein said authorization server provides said cryptographic signing by signing individual network packets, by applying internet protocol (IP) encapsulation by adding a cryptographic hash field to said intercepted network traffic information.

5. The system of claim 4, wherein said firewall system provides inspection of said network traffic information by the process of:
   a) receiving said cryptographically signed individual network packets;
   b) testing validity of said cryptographic signature to provide validated cryptographic signature;
   c) stripping said signature to restore said signed individual network packets to provide the original state prior to interception by the host-based credential management agent; and,
   d) forwarding said original intercepted network traffic information to an internet destination only if said signature is valid.

6. The system of claim 1, wherein said authorization server provides said cryptographic signing by signing individual network packets, by applying an Internet Protocol header field to said intercepted network traffic information.

7. The system of claim 6, wherein said firewall system provides inspection of said network traffic information by the process of:
   a) receiving said cryptographically signed individual network packets;
   b) testing validity of said cryptographic signature to provide validated cryptographic signature;
   c) stripping said signature to restore said signed individual network packets to provide the original state prior to interception by the host-based credential management agent; and,
   d) forwarding said original intercepted network traffic information to an internet destination only if said signature is valid.

8. The system of claim 1, wherein said authorization server provides said cryptographic signing by signing individual network packets, by applying a transport layer wrapping protocol to said intercepted network traffic information.

9. The system of claim 8, wherein said firewall system provides inspection of said network traffic information by the process of:
   a) receiving said cryptographically signed individual wrapped network packets;
   b) testing validity of said cryptographic signature to provide validated cryptographic signature;
   c) stripping said signature and transport layer wrapper to restore said signed individual network packets to provide the original state prior to interception by the host-based credential management agent; and,
   d) forwarding said original intercepted network traffic information to an internet destination only if said signature is valid.

10. The system of claim 1, wherein said authorization server provides said cryptographic signing by a decision making technique.

11. The system of claim 1, wherein said authorization server provides said cryptographic signing by a decision making technique, by the process of:
    a) receiving cryptographic signatures of said application and said network traffic information to provide received cryptographic signature and network traffic information;
    b) identifying the credentials of said remote computer, said received network traffic information and said received cryptographic signature to provide identified intercepted network information and cryptographic signature;
    c) computing a cryptographic signature of said identified traffic information including user authentication to provide computed cryptographic hash of said identified traffic information;
    d) comparing said credentials of said remote computer, said computed network traffic information and said cryptographic signature against a whitelist and/or a blacklist database or comparing intercepted network information against whitelist or backlist database to provide compared computed networked information and compared computed cryptographic signature; and,
    e) digitally signing the network traffic information only if said credentials of said remote computer, said compared computed network information and compared computed cryptographic signature are contained in said whitelist, and not contained in said blacklist.

12. The system of claim 1, wherein said host-based credential management agent provides monitoring of said network traffic information by the process of:
    a) intercepting said transmit network request or said network traffic information to provide said intercepted transmit network request or said network traffic information;
    b) identifying the credentials of said remote computer, of said intercepted network request or said network traffic information to provide identified credentials of said remote computer;
    c) computing a cryptographic hash of said identified information to provide computed cryptographic hash of said network traffic information; and,
    d) forwarding said intercepted transmit network request or said network traffic information, with said computed cryptographic hash of said identified information, to said authorization server.

13. The system of claim 1, wherein said firewall system provides inspection of said network traffic information by the process of:
   a) receiving said cryptographically signed network traffic information;
   b) testing the validity of said cryptographic signature to provide validated cryptographic signature;
   c) stripping said signature to restore said request to provide original state prior to interception by the host-based credential management agent; and,
   d) forwarding said original intercepted network traffic information to an internet destination only if said signature is valid.

14. The system of claim 1, wherein said host-based credential management is configured to intercept network traffic information generated by computer software on said user computer.

15. A method for preventing secured access from a user computer in a network to remote computers presenting untrusted credentials, comprising:
   a) intercepting network traffic information from said user computer utilizing a host-based certificate management agent operably connected to a user computer and transmitting a network request comprising credentials of said remote computer and said network traffic information;
   b) verifying whether the said user computer presenting said credentials of said remote computer in said network request should be granted network access utilizing an authorization server operably connected to said host-based certificate management agent;
   c) verifying whether said credentials of said remote computer are trustworthy utilizing said authorization server operably connected to a trusted credential database containing information identifying trusted entities and corresponding cryptographic certificates;
   d) cryptographically signing said intercepted network traffic information with an authorization server key, to authorize network access for said intercepted network traffic information wherein said authorization server provides said cryptographic signing by adding a token, by adding a tag-value pair to an application layer protocol; and,
   e) inspecting said network traffic information from said user computer and rejecting any traffic information not signed with said authorization server key utilizing a firewall system operably connected to said user computer and said authorization server.

* * * * *